April 18, 1967
W. B. HEMPHILL
3,314,626
AUTOMATIC SHEET SPLICING APPARATUS
Filed March 12, 1964
6 Sheets-Sheet 1
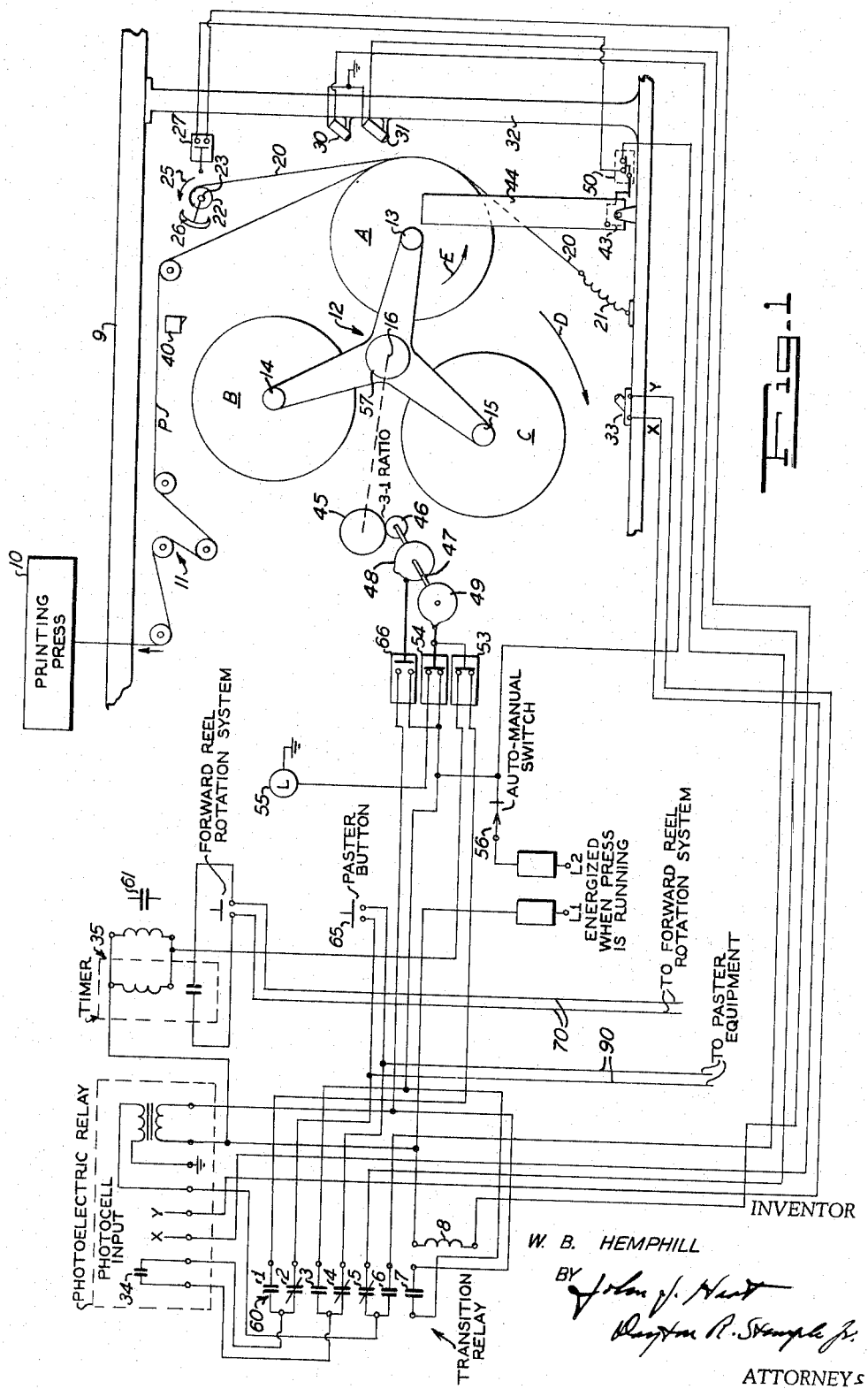
INVENTOR
W. B. HEMPHILL
BY
ATTORNEYS

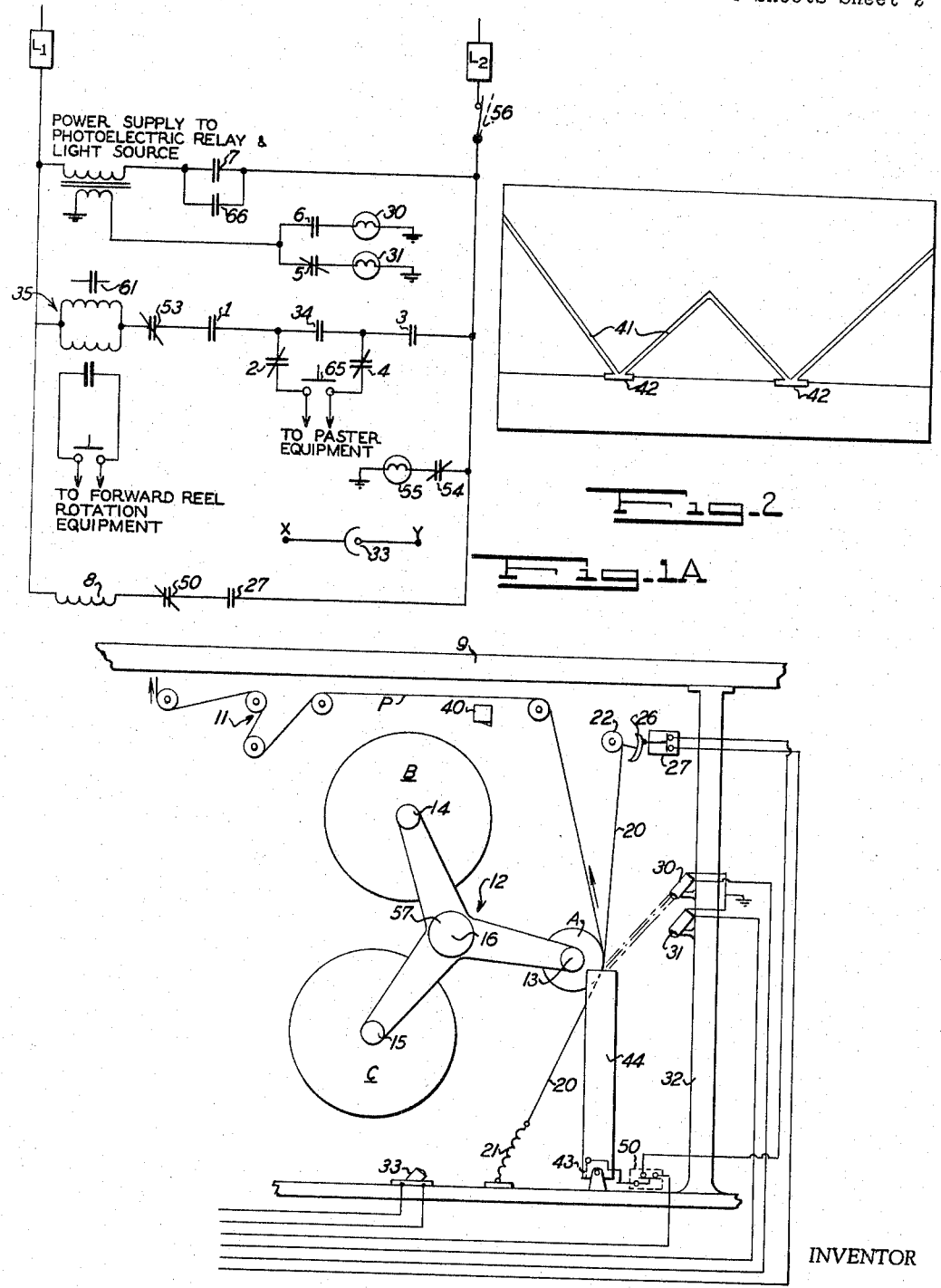

INVENTOR
W. B. HEMPHILL
ATTORNEYS

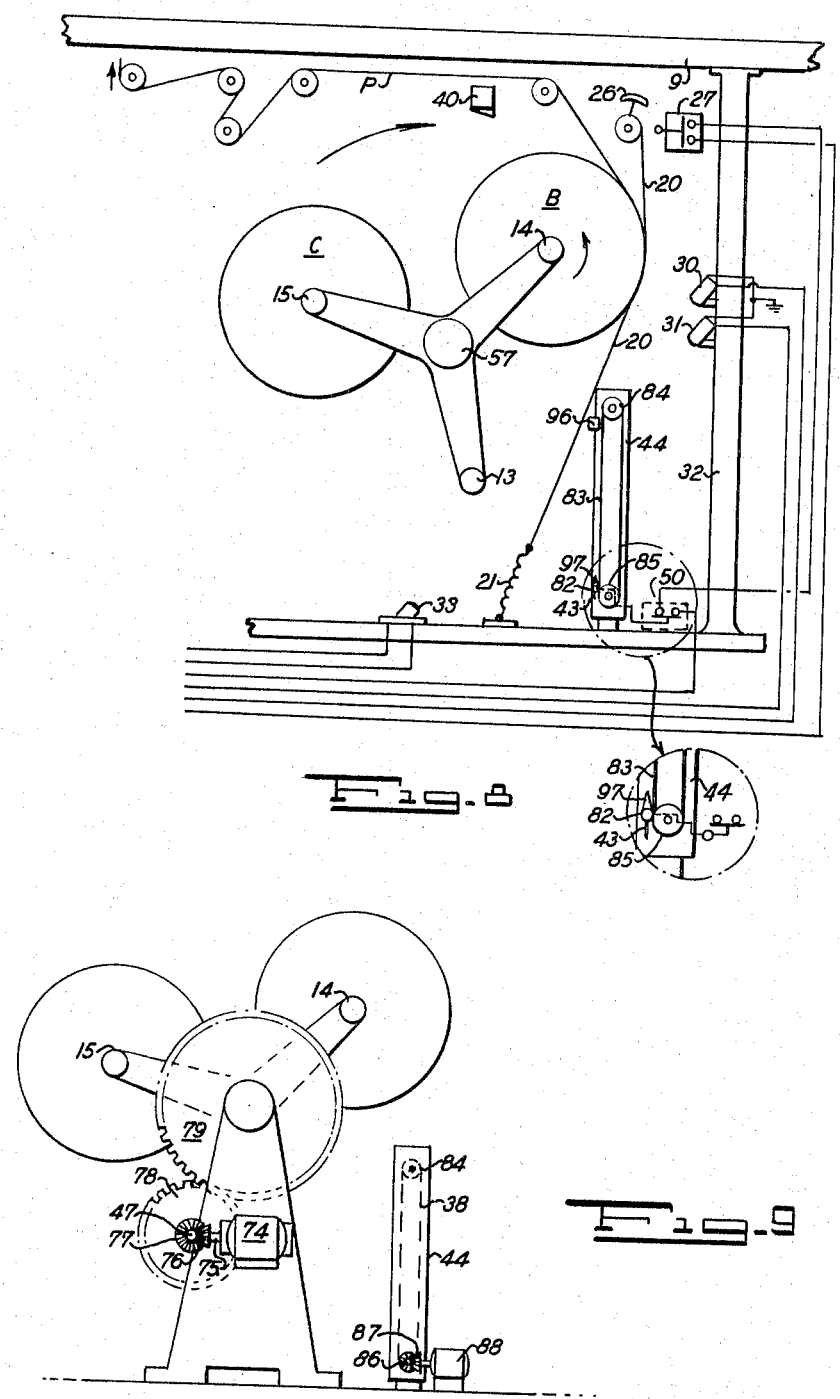

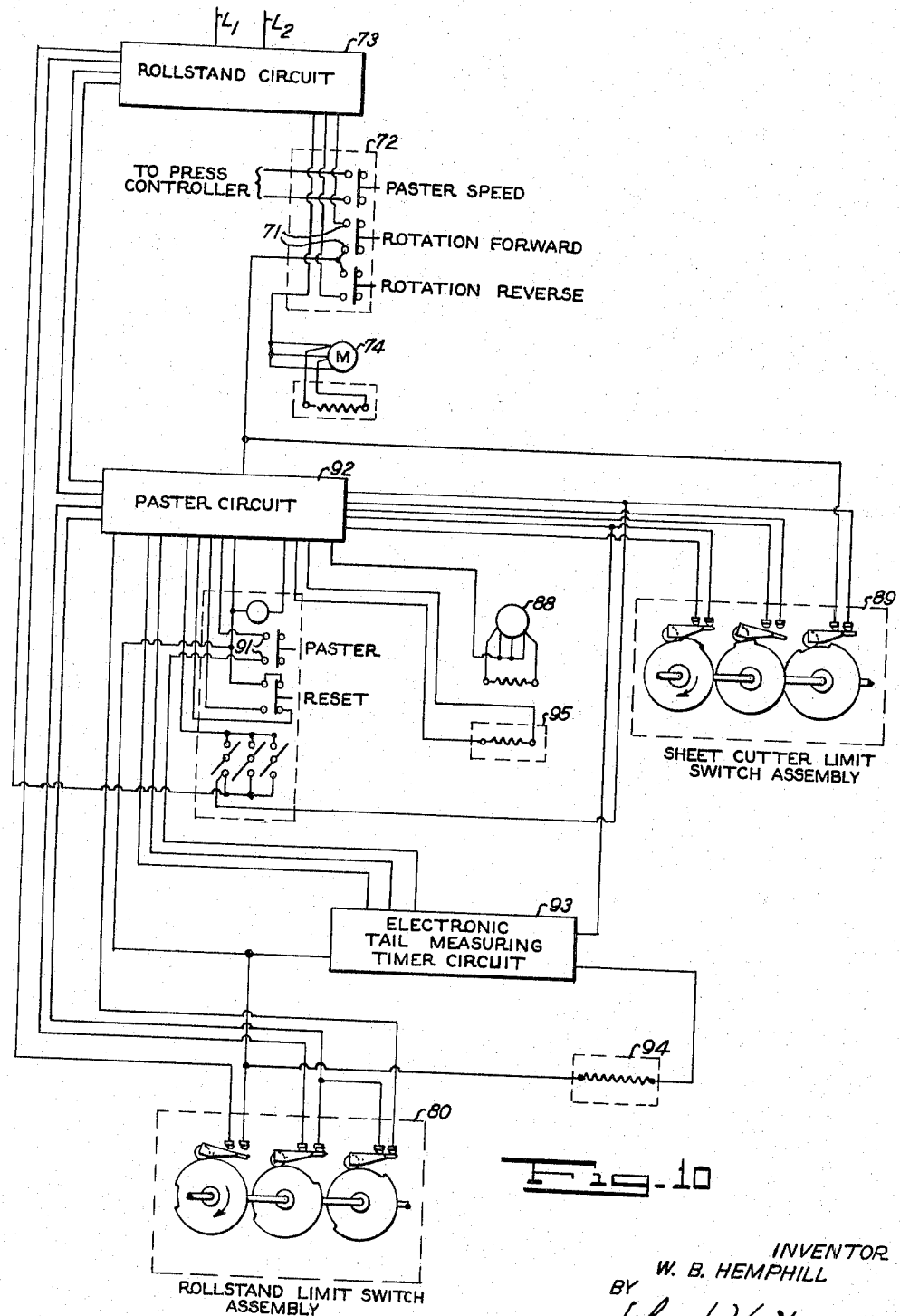

3,314,626
AUTOMATIC SHEET SPLICING APPARATUS
William B. Hemphill, Seattle, Wash., assignor of one-half to Hearst Publishing Company, Inc., New York, N.Y., a corporation of Delaware
Filed Mar. 12, 1964, Ser. No. 351,294
8 Claims. (Cl. 242—58.2)

The present invention relates to apparatus for splicing a running sheet drawn from an expiring roll to the sheet of a new roll.

The apparatus of the invention is particularly adapted to newspaper printing presses in which a continuous paper sheet is drawn from a supply roll at very high velocities and where it is desirable to maintain high press speeds as such expiring supply roll is replaced by a new roll without interrupting the travel of the paper sheet into the press. This operation involves rendering one of the sheets adhesive to accomplish the splice between the sheet of the expiring roll and the sheet of the new roll, and the severance of the expiring sheet from the core of the expiring roll when the splice is completed. At the high speeds at which this operation is carried out, it is important that the proper starting time of the paster operation and the time of the completion of the splice and the severing of the expiring sheet may be determined as accurately as possible, otherwise the waste is quite substantial.

It is accordingly the general purpose of the invention to provide improved apparatus which is capable of reducing paster time and the amount of paper left on an expiring roll, or core waste, to minimums.

In keeping with that purpose, it is an object of the invention to provide improved sheet splicing apparatus that is capable of determining automatically the most efficient time for starting the splicing operation.

Another object of the invention is to provide improved sheet splicing apparatus that will automatically complete the splicing operation so that core waste will be at a minimum.

Other objects of the invention, as well as the advantages and features of novelty of the improved apparatus thereof, will become apparent from the following description when read in connection with the accompanying drawings, in which FIG. 1 is a schematic elevational view of sheet splicing apparatus utilizing the features of the present invention and showing with FIG. 1a, schematic electrical diagrams that indicate the switch and contact conditions when the apparatus is arranged as in FIG. 1;

FIG. 2 is a reduced side elevational view of a new sheet roll and shows the means employed for holding the leading edge of the sheet secured in position against the roll;

FIG. 3 is a schematic elevational view of the sheet splicing apparatus shown in FIG. 1 and shows the condition of the expiring roll when the first of the control lamps is turned on;

FIG. 8 shows the condition of the parts after the splice is completed and the knife has retracted to normal running position;

FIG. 9 is a schematic elevational view showing the driving means for the sheet rolls and the sheet cutter; and FIG. 10 is a schematic diagram of the rollstand, sheet paster and tail measuring circuits.

Figure 4:
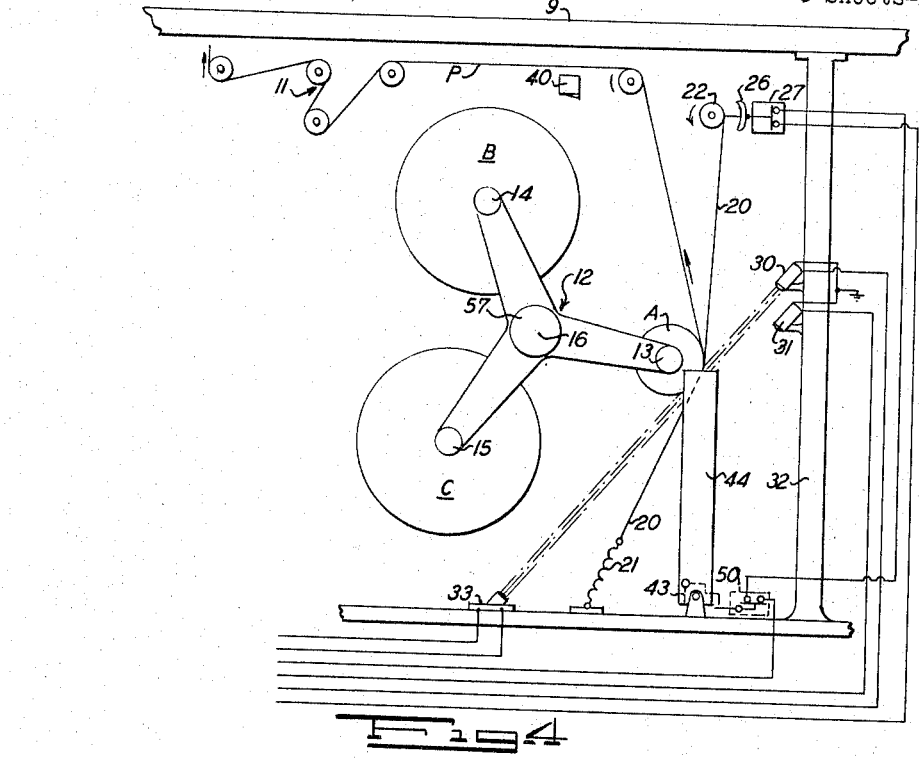
FIG. 4 is a view similar to FIG. 3 and shows the expiring roll reduced to the extent that the light from the control lamp reaches the photocell.

In the drawings, the reference numeral 10 indicates generally a newspaper printing press of conventional construction and which when it is in operation draws upwardly from an expiring roll A, a sheet or web P, of paper. The sheet P in its feed from the roll A, passes around a series of spaced idler rollers 11 as is usual. The roll A is mounted on a conventional three roll reel 12 and a portion of the frame of which containing the reel stand is indicated generally by the reference numeral 9. As is usual in these conventional machines, the reel 12 is rotatable about a central horizontal axis 16 and in addition to roll A, carries rolls of paper B and C. As shown, the expiring roll A is mounted on a spindle 13 of reel 12, the incoming roll B whose sheet will be spliced to the sheet of expiring roll A, is mounted on another spindle 14, and the new roll C is loaded on a third spindle 15 of reel 12 at approximately the position indicated in FIG. 1. The reel moves in a clockwise direction as indicated by the arrow designated D to successively move the rolls into drawing position. While paper is being drawn from an expiring roll A, the roll is rotated in a counterclockwise direction as indicated by the arrow designated E.

A plurality of spaced conventional tensioning or friction straps 20 are in engagement with the periphery of roll A to retard its rotation to the extent that there is created in the sheet P a running tension which assures its smooth passage upwardly into the press. Each of the straps 20 is fixed at its lower end to a tension spring 21 anchored to a fixed surface, extends upwardly from such spring so as to partially wrap and frictionally engage the periphery of the expiring roll A, and is connected at its upper end to the periphery of a roll 22 secured to a tension shaft 23. The shaft 23 is rotated by an automatically controlled torque motor in the direction of the arrow 25 at a predetermined rate dependent upon the diameter of the roll A and at the speed at which the sheet P is withdrawn therefrom. The speed of rotation of shaft 23 is such that it and the roll 22 make somewhat less than one revolution in keeping the tension straps 20 tight against roll A throughout the period it takes to unwind the paper from a full roll to an expired roll. In accordance with the invention, a cam 26 is connected to tension shaft 23 so that it will actuate or close a microswitch 27 shortly before splicing time or to anticipate the paster operation. This can be accomplished with sufficient accuracy for practical purposes for it will be seen from the foregoing that any position in which the cam 26 may be placed with relation to the axis of shaft 23 will be roughly relative to the size of the expiring roll A. Thus by a proper positioning of the cam 26 on shaft 23 and arrangement thereof with switch 27 the cam can be made to actuate switch 27 only a minute or two before the control period is to be started with fair accuracy. It has been found suitable for the purposes of the invention to have the cam 26 close switch 27 when the roll A has expired to about eight inches in diameter. To accomplish this the cam 26 will be approximately in the position shown in FIG. 1 of the drawings relative to switch 27 when roll A is full. The arcuate cam surface of cam 26 is of such length that the switch 27 will be maintained closed throughout the length of the controlled period in which the pasting and splicing operations take place.

Figure 5:
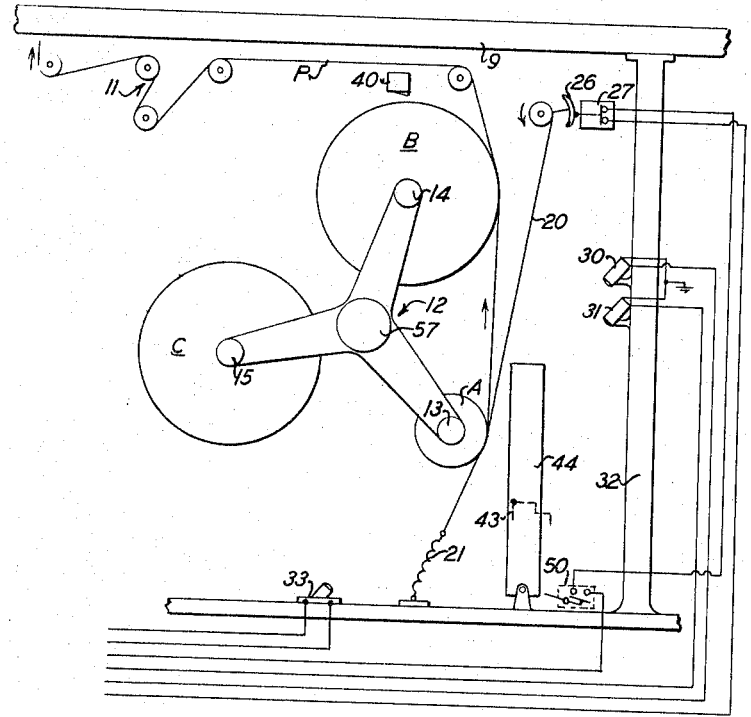
FIG. 5 is a view similar to FIGS. 3 and 4 and shows the reel now advanced to bring the incoming roll into engagement with the running sheet, the knife raising to its operative position and both lights dark.

Contained in the circuit are two suitable lamp sources 30 and 31 mounted on a standard or member 32 of the machine frame 9 so as to project beams of light down onto the roll A and toward a photoelectric cell 33 of known construction mounted on the base of the machine and connected to a photoelectric relay through the conductors indicated by the letters X, Y. The lamp 30 is arranged above the light 31 on the standard 32 and its arrangement thereon is such that the beam therefrom will be blocked by the roll A until the latter has expired to the proper given size to start the control period. When that occurs and some of the light from the lamp 30 strikes the photocell 33, which is preferably a very sensitive cadmium sulphide photocell, the contacts 34 of the photoelectric relay are caused to close. The closing of relay contacts 34 energizes a timer 35 which in turn causes the reel motor to be energized and turn the reel clockwise in the direction of arrow D to advance the incoming roll B. As will be observed from a comparison of FIGS. 1 and 10, the timer is connected by the conductor wires 70 to the terminals 71 of a pushbutton station 72 in the forward reel rotation system of the machine. As indicated such system includes a rollstand circuit 73 in which is included a rotation motor 74. As indicated in FIG. 9 of the drawings, motor 74 has a drive shaft 75 provided with a gear 76 which meshes with a gear 77 provided on the reel drive shaft 47 (FIG. 1). Also provided on drive shaft 47 is a gear 78 which drives a gear 79 carried by the reel shaft. The rotation system also includes a limit switch assembly 80 for automatically bringing the reel to a stop when the incoming roll has advanced to the first position in which it is brought into contact with the sheet P feeding from roll A to the press. As is hereinafter indicated, this first position is shown in FIG. 5 of the drawings. At this point the knife 43 starts to raise from retracted position to the position shown in FIG. 6. As indicated in FIGS. 8 and 9 of the drawings, the knife 43 comprises a transverse rod 82 which is supported at its ends by two chains 83, 83, each of which is mounted on a top sprocket 84 and a bottom sprocket 85 mounted on shafts provided on the stands 44. The lower sprocket shaft carries a gear 86 which meshes with a gear 87 provided on the drive shaft of the knife or sheet cutter motor 88. As is shown in FIG. 10 the motor 88 is associated with a knife limit switch assembly 89 that is electrically interlocked with the rollstand limit switch assembly 80 and a suitable magnetic relay system in the rollstand circuit.

As the incoming roll B advances to its automatic stop position, the roll A will of course be correspondingly advanced by the reel in a clockwise direction. When at such first position the rising knife reaches its cutting position, the aforesaid limit switch assemblies cause the reel to advance the roll B from such position (FIG. 5), to its second automatic stop position shown in FIG. 6 and again bring such reel to a stop. At about the time the roll B reaches its second automatic stop position, lamp 31 is turned on to measure for the actual splice. As soon as the roll A has diminished to the given size for the splice, light from lamp 31 will get by such roll and cause the relay contacts of the photocell 33 to close and actuate a spraying device 40 to render adhesive a dry adhesive tape on the incoming roll B. As is shown in FIG. 1, the contacts 34 of the photoelectric relay are connected by the conductor wires 90 to the terminals 91 in the paster circuit 92 which is associated with an electronic timer circuit 93 and a pneumatic system controlled by a solenoid valve 94 for causing the spray device 40 to spray the adhesive activating material on an adhesive tape provided on the incoming roll B. The electronic timer circuit 93 times the operation to allow the expiring web to completely cover the adhesive activated portion of the incoming roll B and then functions to actuate the sheet cutter solenoid valve 95 to cause the knife actuating mechanism to operate the knife 43 to cut off the expiring roll A as illustrated in FIG. 7 of the drawings. The sheet cutter solenoid valve 95 controls an air cylinder and plunger device 96 which as is shown in FIG. 8 of the drawings, is mounted on one of the stands 44 and coacts with a lever 97 mounted on the associated end of the knife rod 82 to pivot the latter and thereby flip the knife 43 against the paper of the expiring roll A. It will be noted from FIG. 2 of the drawings, that the dry adhesive tape 41 is securely glued to the body of the roll B in zig-zag fashion across the width of the roll to provide at the end of the roll two apexes at which are provided tabs 42, 42 for holding the end edge of the sheet tightly against the roll. The outer surface of the tape 41 is provided with a dry adhesive which becomes very sticky when sprayed with trichlorethylene and readily adheres to the running sheet P so securely that the two tabs 42, 42 are pulled off and the end of the sheet of the new roll B is carried along with the running sheet P through the press. Shortly thereafter as above stated the sheet severing knife 43 flips out and cuts off the sheet of roll A.

The cutting knife 43 is automatically reciprocated vertically between the tension straps 20 on two spaced stands 44 located on either side of the roll A. When all three spindles of the reel are loaded with full rolls of paper and in proper running position, as shown in FIG. 1 of the drawings, the cutting knife 43 is in its retracted lower position and holds closed the control circuit measuring cut-out switch 50 as in FIGS. 1, 3, 4, and 8. The knife 43 maintains this position until the roll B makes the first automatic stop position, at which time knife 43 starts up stand 44 from its retracted position which opens switch 50 (FIG. 5) dropping transition relay 60 and turning off photo system and light 30. It will be noted from FIG. 1 of the drawings that the disclosed transition relay 60 includes seven contacts indicated by the numerals 1 to 7 and an inductor designated 8, and from such figure and FIG. 1a that in the normal dropped position of such relay contacts 1, 3, 6 and 7 thereof will be open and contacts 2, 4 and 5 thereof will be closed. When the transition relay 60 is picked up in the operations of the system, contacts 1, 3, 6 and 7 will be closed and contacts 2, 4 and 5 thereof opened.

The control system is energized while the press 10 is running on the main motors and drawing paper from the expiring roll A. The auto-manual switch 56 must also be on. The operator then puts the reel in proper position for automatic operation, thus causing a reel position switch 54 and a reel position light switch 55 to be closed (note FIGS. 1, 1a). As is indicated in FIG. 1 of the drawings, the shaft of the reel 12 has connected thereto a gear 45 which meshes with a gear 46 provided on the reel drive shaft 47, the relation of the two gears being such that they provide a 3-1 ratio. In accordance with this invention there is provided on the shaft 47 a pair of cams 48 and 49, cam 48 being associated with and actuating switch 66 and cam 49 being associated with and actuating switch 54. It will be understood, that as a result of the 3-1 ratio of the gears 45, 46, for every 120 degrees of rotation of the reel 12, each of the cams 48 and 49 will rotate 360 degrees. Thus, in each 120 degrees rotation of the reel 12 and the three rolls of paper A, B and C, during which occurs the incoming of a new roll, the expiration of the expiring roll, the splicing, and the reposition of the new roll, the cams 48 and 49 operate the switches 66 and 54, respectively, to cause the same sequence of events. At the start of each 120 degrees cycle of operation with the positioning of a roll on any one of the arms of the roll 12, the operator will put the reel in proper position for automatic operation in connection with the roll on a particular reel arm by advancing the new or incoming roll B to a position in which cam 49 will close switch 54 to cause the reel position light 55 to be lighted. This will also close switch 53 to activate the rotation reel timer 35. The electric circuit contacts will then be in the condition shown in FIG. 1a of the drawings. Switches 53 and 54 are mounted in the housing 57 for the reel rotation drive assembly on the reel stand and prevent automatic operation in any but the proper reel position and indicate such proper position by switch 54 causing a position light 55 to come on when switch 53 is closed. The switches 53 and 54 are set very close in differential so as to cause a uniform start of the reel when the core expires to starting size.

The reel being set in the proper position for automatic start on, automatic-manual switch 56 is depressed to the automatic position, thereby connecting the circuit to a suitable source of power through the power lines $L_1$ and $L_2$. It will be noted that at this time the two lamps 30 and 31 in the control system will not be on because the start measuring cam 26 on the tension shaft 23 will not as yet have rotated a sufficient extent to come into contact with the start measuring switch 27 (note FIG. 1). When the roll A expires to about eight inches in diameter, as is shown in FIG. 3 of the drawings, the cam 26 will come into contact with and close the start measuring microswitch 27, thereby picking up the transition relay 60 which transfers the electric eye 33 from the splicing to the starting control circuit, energizing the photoelectric system, and turning on the top or start measuring light 30. When the transition relay 60 is energized its contact 7 will close, 6 will close and 5 will open. This will energize the top light 30 and the bottom light 31 will be disconnected. Closed contact 7 will energize the photo system. Contacts 1 and 3 will close, putting the photo electric relay contact 34 in a condition to energize timer 35 through closed contacts of reel position switch 53. Contacts 2 and 4 will be open at this time, as they are on the transition relay. This disconnects photo relay contacts 34 from the paster button circuit. However, nothing further happens at this time, as the expiring roll A is still too large to let any light by, as indicated in FIG. 3. This setting therefore is not a critical one and variations in the tension setting would only cause the start measuring cycle to be on a longer or shorter time which is not of great importance.

When roll A expires to proper starting size as shown in FIG. 4 of the drawings, the light from lamp 30 will pass such roll and strike the photocell 33 in the floor of the machine. As before indicated, this causes the photoelectric relay contacts 34 to close, thereby picking up the timer 35 through the reel position switch 53. A press slow down relay 61 if desired will also close momentarily to slow the press to paster speed upon the start of the first cycle of the paster. The timer 35 will cause the reel to move in a clockwise direction to the first automatic stop position in which the incoming roll B will be almost in the position shown in FIG. 5 of the drawings. It will be noted in FIG. 5, that in the said position, the incoming roll B will be in contact with the running sheet P which will cause roll B to start turning in the direction indicated by arrow 62. As soon as the reel starts its aforesaid movement to the automatic stop position, it will cause the opening of switch 53 thereby breaking the circuit to the timer 35. At the same time the expiring roll A will move down in front of the light beam from lamp 30 causing the photoelectric relay contacts 34 to open. The contacts of the timer 35 are timed to positively bring the reel to its first automatic stop as shown in FIG. 5. This causes the severing knife to raise from its retracted position to sheet-cutting position.

It will be noted also from FIG. 5, that the start measuring switch 27 is still held closed by the tension shaft cam 26. As previously explained, switch 27 is connected to the transfer relay 60 through the measuring cut-out switch 50 housed in the severing knife stand 44. As switch 50 was held closed by the knife 43 in its retracted position, it is now open, or off, since such knife has been raised to cutting position. This will drop the transfer relay 60 to normal position to bring the contacts 1 to 7 thereof to the condition showing in FIGS. 1, 1a and causing the lower light 31 to be connected to its source of supply in the photo relay, when switch 66 is closed in final paster position, and causing the normally open photo relay contacts 34 to be connected to the paster button 65.

Figure 6:
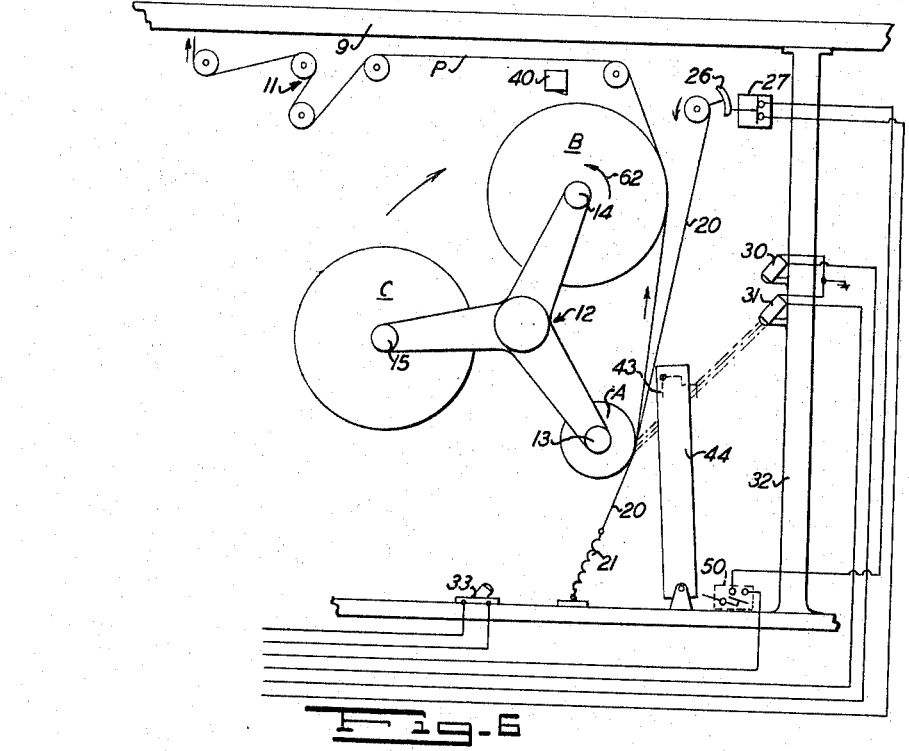
FIG. 6 shows the reel in final paster position, at which time the switch 66 shown in FIG. 1 will be closed energizing the photo system and the bottom light, or light 31, in FIG. 6 will be on and measuring for actual splice.
Figure 7:
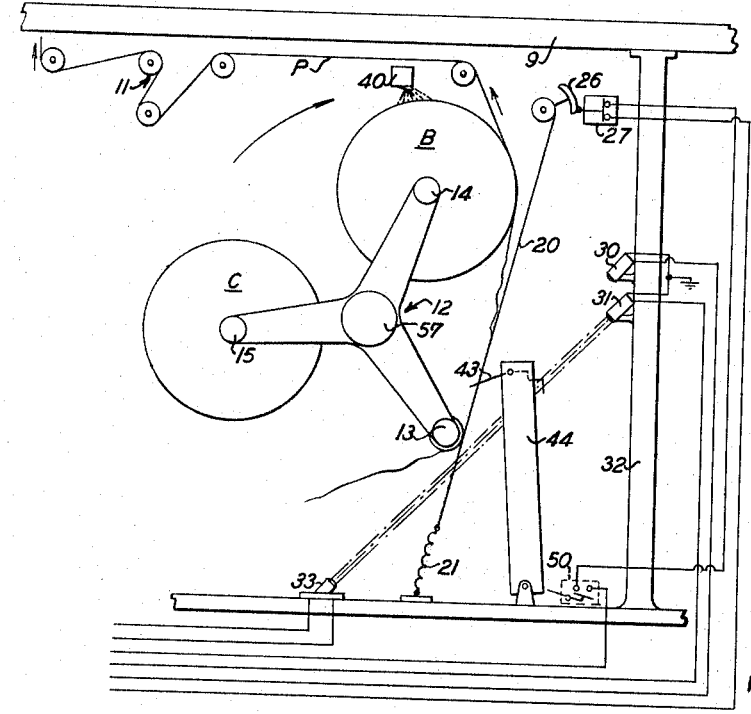
FIG. 7 is a view similar to FIGS. 3 to 6 and shows the core expired to the extent that light from the second lamp reaches the photocell and the adhesive means operated.

When the knife 43 reaches its final cutting position as shown in FIG. 6 and the reel has advanced into the running web to its second cycle position as shown in such figure, the automatic stop position thereof being considered the second cycle position of the reel, a microswitch 66 in the reel housing 57 is closed by the cam 48 and energizes the photoelectric system again through a set of normally closed contacts on the transfer or transition relay 60. At the same time through another set of normally closed contacts 5 on the transition relay 60, the bottom or splicing light 31 is turned on and as is shown in FIG. 6 of the drawings, is now measuring the expiring roll A for the actual splice. Contacts 2 and 4 of the transition relay are closed, thus putting photo relay contact 34 across the paster button.

As the roll A expires to splicing size, the incoming roll B will have been in contact with the running strip or web P long enough to be synchronized with it, so that when the splice is made the difference in speed will not overstrain the web and break it, causing the operation to fail. When the roll A is reduced to splicing size, light from the lamp 31 will reach the photocell 33 as shown in FIG. 7 and cause the photo relay contacts 34 to close across the paster button 65 through the normally closed contacts of the transfer relay 60, thereby causing a timed spray of trichlorethylene to be sprayed on the incoming roll B. As previously stated, when this occurs the now sticky strips 41 will adhere to the running sheet P and pull off the little tabs 42, thereby enabling the running sheet P to pull the new sheet from incoming roll B through the press. Shortly after this, the usual timing means flips the severing knife 43 in the manner indicated in FIG. 7 of the drawings to cut the sheet of roll A from the sheet now running into the press from roll B. By this time the start measuring cam 26 will move out of contact with start measuring switch 27 and permit the latter to open. The reel then advances to about the position shown in FIG. 8 of the drawings, opening the microswitch 66 in the reel housing 57 and deenergizing the photoelectric system until the next roll is needed. The knife 43 then retracts out of the way of the incoming roll B which has now become the new expiring roll A and which is moving to about the position shown in FIG. 8 of the drawings. The old expired roll A at the same time will have moved to a position where it can readily be replaced with a new roll while the press is drawing paper from the new expiring roll A. The circuit will now be in the condition shown in FIGS. 1, 1a except that the reel position switch 53 and the reel position light switch 54 will be open. When the new roll is mounted onto the reel, it is made up with tape 41, and the reel positioned to the indicater light 55 ready for another splice to be made without further attention.

While I have hereinabove described and illustrated in the drawings, a preferred embodiment of my invention, it will be apparent to those skilled in the art that various changes and modifications therein may be made without departing from the spirit of the invention or the scope of the appended claims.

I claim:

1. Apparatus for automatically splicing a running web from an expiring roll to the web of a new roll, comprising a reel for rotatably supporting said rolls and adapted to move the new roll into engagement with the running web of the expiring roll, a first light means for sensing when the expiring roll has expired to a first given diameter, means for rotating said reel to advance said rolls so that the new roll is moved into engagement with the running web of the expiring roll, means controlled by said light sensing means and operable by the latter when the expiring roll has expired to the given diameter to actuate said reel rotating means, a second light means for sensing when the expiring roll in its advanced position has expired to a second reduced given diameter, means for rendering adhesive the exposed end portion of the new roll, means controlled by said second light sensing means and operable by the latter when the expiring roll has expired to the second reduced given diameter to actuate said adhesive means and thereby cause the webs to be spliced, and web severing means operable when the webs are spliced to sever the web of the expiring roll.

2. Apparatus for automatically splicing a running web from an expiring roll to the web of a new roll, comprising a reel for rotatably supporting said rolls and adapted to move the new roll into engagement with the running web of the expiring roll, means for sensing when the expiring roll has expired to a first given diameter, including a first light emitting device on one side of the expiring roll and a light responsive device on the other side of the expiring roll adapted to receive light from said light emitting device when the expiring roll has expired to said given diameter, means for rendering said light emitting device operative prior to the reduction of the expiring roll to said given diameter, means for rotating said reel to advance said rolls so that the new roll is moved into engagement with the running web of the expiring roll, first means controlled by said light sensing means and operable by the latter when the expiring roll has expired to the given diameter to actuate said reel rotating means, means for sensing when the expiring roll in its advanced position has expired to a second reduced given diameter including a second light emitting device on one side of the expiring roll in its advanced position and said light responsive device which in such advanced position of the expiring roll is adapted to receive light from said second light emitting means when the expiring roll has expired to said given reduced diameter, means for rendering said second light emitting device operative prior to the reduction of the expiring roll to said given reduced diameter, means for rendering adhesive the exposed end portion of the new roll, second means controlled by said light sensing means and operable by the latter when the expiring roll has expired to the second reduced given diameter to actuate said adhesive means and thereby cause the webs to be spliced, and web severing means operable when the webs are spliced to sever the web of the expiring roll.

3. Apparatus for automatically splicing a running web from an expiring roll to the web of a new roll, comprising a reel for rotatably supporting said rolls and adapted to move the new roll into engagement with the running web of the expiring roll, a first light means for sensing when the expiring roll has expired to a first given diameter, means for rendering said light sensing means operative when the expiring roll has expired to a selected diameter larger than said given diameter, means for rotating said reel to advance said rolls so that the new roll is moved into engagement with the running web of the expiring roll, means controlled by said light sensing means and operable by the latter when the expiring roll has expired to the given diameter to actuate said reel rotating means, a second light means for sensing when the expiring roll in its advanced position has expired to a second reduced given diameter, means for rendering said second light sensing means operative when said expiring roll has moved to its advanced position and prior to the reduction of the expiring roll to said given reduced diameter, means for rendering adhesive the exposed end portion of the new roll, means controlled by said second light sensing means and operable by the latter when the expiring roll has expired to the second reduced given diameter to actuate said adhesive means and thereby cause the webs to be spliced, and web severing means operable when the webs are spliced to sever the web of the expiring roll.

4. Apparatus such as defined in claim 3 in which said means for rendering said first light sensing means operative comprises a member rotatable through a given angle during the period it takes the expiring roll to change from a full roll to an expired roll, so that the position of said member approximates the size of the roll, a switch actuating member carried by said rotatable member, and a control switch operable by said member when the expiring roll reaches said selected diameter.

5. Apparatus such as defined in claim 4, in which said switch actuating member is configured to maintain said control switch operable throughout the period said expiring roll is expiring from said selected diameter to said given reduced diameter.

6. Apparatus such as defined in claim 3, in which said means for rendering said second light sensing means operative comprises a control switch and a cam associated with said reel and operable when the latter has moved said expiring roll to said advanced position to actuate said control switch.

7. Apparatus for automatically splicing a running web from an expiring roll to the web of a new roll, comprising a reel for rotatably supporting said rolls and adapted to move the new roll into engagement with the running web of the expiring roll, a first light means for sensing when the expiring roll has expired to a first given diameter, means for rendering said light sensing means operative when the expiring roll has expired to a selected diameter larger than said given diameter, means for rotating said reel to advance said rolls so that the new roll is moved into engagement with the running web of the expiring roll, means controlled by said light sensing means and operable by the latter when the expiring roll has expired to the given diameter to actuate said reel rotating means, a second light means for sensing when the expiring roll in its advanced position has expired to a second reduced given diameter, means for rendering said second light sensing means operative when said expiring roll has moved to its advanced position and prior to the reduction of the expiring roll to said given reduced diameter, means for rendering adhesive the exposed end portion of the new roll, means controlled by said second light sensing means and operable by the latter when the expiring roll has expired to the second reduced given diameter to actuate said adhesive means and thereby cause the webs to be spliced, and web severing means operable when the webs are spliced to sever the web of the expiring roll, and including a cutting device movable from a retracted position into cutting position, and a control switch connected to and controlling said means for rendering said first light sensing means operative, said control switch being controlled by said cutting device in its retracted position and operable on the movement of said device to cutting position to render said first light sensing means inoperative.

8. Apparatus such as defined in claim 1, in which the means controlled by said first light sensing means comprises a timer operable with said reel rotating means to take said reel to a given advanced position and automatically bring said reel to a stop at such position.

References Cited by the Examiner

UNITED STATES PATENTS

| | | | |
|---|---|---|---|
| 2,032,244 | 2/1936 | Wood | 242—58.3 |
| 2,120,778 | 6/1938 | Dunlap | 242—58.2 |
| 2,311,626 | 2/1943 | Cline | 242—58.2 |
| 3,100,604 | 8/1963 | Degutis et al. | 242—58.3 |
| 3,103,320 | 9/1963 | Huck | 242—58.3 |
| 3,236,470 | 2/1966 | Huck et al. | 242—58.3 |

STANLEY N. GILREATH, *Primary Examiner.*

MERVIN STEIN, FRANK J. COHEN, *Examiners.*

W. S. BURDEN, *Assistant Examiner.*